July 5, 1932. A. R. KETCHAM 1,865,766
MOLDING FOR RUNNING BOARDS AND THE LIKE
Filed Aug. 27, 1930
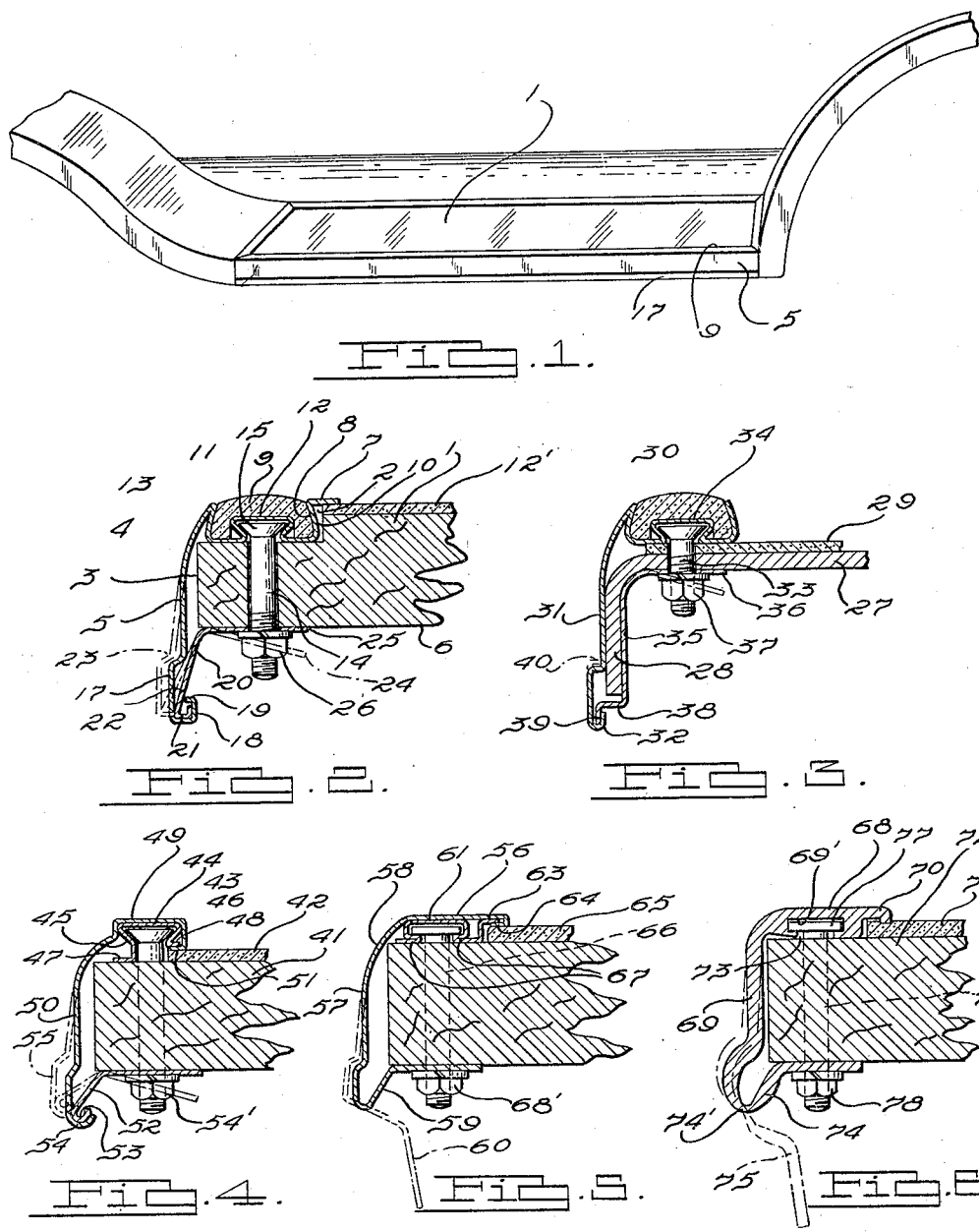
INVENTOR
Alonzo R. Ketcham.
BY
Harness, Dickey, Pierce & Hann
ATTORNEY Patented July 5, 1932

1,865,766

UNITED STATES PATENT OFFICE

ALONZO R. KETCHAM, OF DETROIT, MICHIGAN

MOLDING FOR RUNNING BOARDS AND THE LIKE

Application filed August 27, 1930. Serial No. 478,017.

This invention relates to improved moldings, particularly of the type used on automobile running boards.

The main objects of the invention are to provide a molding which is adapted to hold down and compress the marginal portions of a mat upon the edge portions of a running board; to provide a structure of this kind which also retains a tread strip on the edge portions of a running board; to provide a tread strip retaining molding having a replaceable tread member comprising material having a high coefficient of friction such as a yieldable rubber composition; and to provide moldings of this kind which may be mounted in a recess in a running board so as to position the top of the tread strip approximately in the plane of the mat and which may also be mounted in superimposed relation upon the edge portions of a running board.

Other objects of the invention are to provide a molding of improved construction having a bolt head receiving recess on its lower sides; to provide a recess of this kind which is constricted at its open side and adapted to hold a bolt head against outward displacement so as to enable clamping of the horizontal part of the molding on the upper side of the running board by a bolt having a concealed head; to provide a molding having a recess of this kind in which bolts having conventional tapered screw-heads may be used; to provide improved means for tensionally drawing the vertical side of a molding downwardly and toward the edge of a running board; and to provide means of this kind which is operable by the same bolt that secures the horizontal part of the molding in place.

Further objects of the invention are to provide moldings and fastening means of this type which are suitable for use on wood and metal running boards, and to provide means for concealing the nut end of the bolts and the nuts thereon from view.

An illustrative embodiment of the invention is shown in the accompanying drawing, in which:

Fig. 1 is a fragmentary perspective view of a vehicle showing a running board embodying the invention.

Fig. 2 is a fragmentary, vertical transverse section taken on the line 2—2 of Fig. 1.

Fig. 3 is a fragmentary transverse section of a running board showing another form of the invention.

Fig. 4 is a fragmentary transverse section of a running board showing a further development of the invention.

Fig. 5 is a fragmentary transverse section of a running board which is equipped with a modified form of molding.

Fig. 6 is a fragmentary transverse section illustrating another modification of the invention.

In the form shown in Figs. 1 and 2, the improved molding is arranged on the side and end edges of a running board 1 of the type generally used on passenger vehicles. The running board 1 has a recess 2 on its upper side adjacent the outer edge 3 thereof in which the top flange or section 4 of the molding is seated. The molding includes a metal angle bar of which the flange 4 constitutes one side and it has a downwardly and forwardly extending side 5 which is located in advance of the outer edge 3 of the board and which protrudes downwardly beyond the lower surface 6 of the latter.

Formed on the inner edge of the top or horizontal part of the molding is an inwardly extending flange 7 which overlaps the outer edge portions of a mat 12 which is preferably formed of rubber. The horizontal part of the molding has a longitudinally extending groove 8 in which a tread strip 9 is mounted. The tread strip preferably comprises a yieldable composition having a relatively high coefficient of friction, such as rubber, and it is held in place by the side walls 10 and 11 of the groove which extend inwardly toward each other at their upper extremities.

The lower side or bottom wall of the groove 8 extends upwardly at its central portion providing a longitudinal rib 12 having a dove-tail recess 13 which is open at the lower side of the flange 4 of the molding. The recess 13 is adapted to receive the head of a bolt 14 or other suitable fastening means. In the form shown the bolt 14 has a frusto-conical head 15 which is held against displacement from the molding by the converging sides of the rib 12 which restrict the open side of the groove 13.

The downwardly extending side 5 or flange of the molding has an outwardly offset portion 17 near its lower edge and it is provided on its lower extremity with an inwardly formed open head 18, the open side of the bead being constricted by a lip 19.

The molding extends the full length of the edges of the running board 1 and it is provided with a plurality of bolts 14 which are spaced apart throughout the length thereof, the heads of the bolts being concealed from view by reason of their attachment to the lower side of the horizontal part 4. Mounted on the lower ends of the bolts 14 is an angle bar 20 which has a rim or bead 21 on a downwardly extending side 22 of the angle bar. The downwardly extending side 22 passes through the open side of the bead 18 on the member 5 of the molding and the bead 21 of the angle bar 20 is engaged in the bead 18 in an interlocked relation.

During assembly of the running board the downwardly extending part 5 of the molding and the angle bar 20 initially assume the dotted line positions shown at 23 and 24, respectively. At this stage in the application of the molding to the running board the lower ends of the bolts 14 are received in apertures of the other side 25 of the angle member 20 and the bent edge thereof bears against the lower side 6 of the running board. Threaded on the lower end of the bolt 14 is a nut 26, which when tightened firmly clamps the horizontal part 4 of the molding upon the upper side thereof and urges the flange 7 downwardly upon the mat 12. The tightening of the bolt also rotates the angle bar 20 in a counter-clockwise direction drawing the downwardly extending part 5 of the molding inwardly and urging the same downwardly to the full line position, shown in Fig. 2. That portion of the downwardly extending flange 5 of the molding which protrudes beyond the lower surface 6 of the running board conceals the lower end of the bolt, the nut and the angle bar or fastening member 20 from view when the running board is observed in elevation.

In the form shown in Fig. 3 my improved molding is illustrated in connection with a metal running board having a tread part 27 and a vertical flange or riser 28. A mat 29 is located on the upper side of the tread part 27. The outer edge portions of the mat 28 extend substantially to the outer edge of the running board and they are covered by the top side or flange 30 of a molding which is of substantially the same construction as the top side 12 of the molding shown in Fig. 2. This molding has a downwardly extending side 31 which protrudes slightly beyond the lower edge of the riser 28 and it is provided with an open, U-shaped bead 32.

The heads of bolts 33 are received in the recess of the ridge 34 and the threaded stems of the bolts extend downwardly through registering apertures in the mat 29 and riser 27 respectively. Mounted on the lower end of the bolts is an angular strip or bar having a substantially vertical side 35 located adjacent the inner surface of the riser 28. This bar is formed of resilient sheet metal material and the upper side 36 thereof normally assumes the dotted line position shown in Fig. 3 before it is clamped against the lower surface of the tread 27 by a nut 37. The lower edge portion of the vertical side 35 of the angular strip is offset outwardly at 38 and its extremity 39 is received in the bead 32 of the vertical side 31 of the molding. When the nut 37 is screwed upwardly the horizontal part of the molding is clamped upon the mat 29 and riser 27 and the flanges 36 of the angular strip is bent upwardly to the full line position shown in the drawing. This action urges the side 31 of the molding downwardly from the dotted line position shown at 40.

In the form shown in Fig. 4 a wooden running board 41 having a mat 42 on its upper side is provided with spaced apertures through which bolts 43 extend. The heads of the bolts are received in a dove-tail groove of a strip 44 which extends longitudinally of the edge portions of the running board. This strip is formed of sheet metal material and it has an upper wall on which inwardly converging sides 45 and 46 are formed. The side 45 extends downwardly to the upper surface of the running board 41 and it has an outwardly projecting flange 47 which is seated upon the latter surface. The other side 46 of the member 44 has an outwardly extending lip 48 which is located slightly above the upper side of the mat 42.

A molding strip having a horizontal side 49 is mounted on top of the member 44. This molding comprises yieldable sheet metal material and it has a downwardly extending side 50. The inner edge portions 51 of the horizontal side 49 are disposed downwardly and forwardly and the inner extremity of the upper side of the molding is engaged between the lip 48 and the top surface of the mat 42.

An angular strip 52 of sheet metal material is mounted on the lower ends of the bolts 43. This strip has an outwardly extending side on the edge of which is formed an arcuate shaped bead 53 which is received in a substantially semi-cylindrical trough 54 on the lower extremity of the downwardly extending side of the molding. Nuts 54' threaded on the lower ends of the bolts 43. when tightened, firmly clamp the molding on the upper side of the running board and secure the mat 42 in place.

These nuts also hold the angular strip 52 in the full line position shown in the drawing, thereby urging the side 50 of the molding inwardly and downwardly from the dotted line position shown at 55.

In the form shown in Fig. 5 the molding includes an integral piece of sheet metal having a horizontal side 56 and a downwardly extending side 57 between which is formed a rounded or arcuate portion 58. An inwardly bent extension 59 of the side 57 is integrally formed thereon. This extension initially assumes the dotted line position shown at 60.

Located below the upper side 56 of the molding is a bar 61 formed of sheet metal material. This bar is substantially tubular in shape and it has a lower restricted open side. The member 61 has a flange 63 extending inwardly with respect to the running board which is received between the upper side of the molding and a reversely bent lip 64 on the inner edge thereof. The lip 64 is seated upon a mat 65 on the upper side of the running board.

During installation of a molding of this type the extension 60 is bent upwardly and the threaded ends of bolts 66 are inserted through apertures therein. The bolts extend into the tubular member 61, the heads thereof being secured against displacement from the member 61 by inwardly extending convolutions 67 which restrict the open side of the member 61. A nut 68' holds the extension 60 and the side 57 of the molding in the full line position shown in the drawing.

In the form shown in Fig. 6 the molding includes an integral strip of rolled metal and it has angularly disposed sides 68 and 69. The top side 68 of the molding has a rearwardly extending edge portion 70 which overhangs the edge portions of a mat 71 located on a running board 72. Formed in the top side 68 is a passage 69'. This passage communicates with a slot 73 formed in the inner side of the top of the molding. The slot is narrower than the passage 69' thereby providing a restricted outlet.

Integrally formed on the lower edge of the downwardly extending side 69 of the molding is an extension 74 which initially assumes the dotted line position shown at 75 before the molding is secured in place. This extension and the downwardly extending side 69 have a junction which is of reduced thickness and the extension is provided with apertures for receiving bolts 76 which have their heads 77 located in the passage 69' of the upper side of the molding. The downwardly extending side 69 is secured in place by bending the extension 74 upwardly at the reduced portion 74'. The bolts 76 are provided with nuts 78 by which the top side 68 and the extension 74 of the molding are clamped on the edge portions of the running board, the flange 70 serving to clamp the mat 71 in place.

Although but several specific embodiments of this invention have been herein shown and described, it will be understood that numerous details of the construction shown may be altered or omitted without departing from the spirit of this invention as defined by the following claims.

What I claim is:

1. A molding including a pair of angularly disposed parts, means for clamping one of said parts upon one side of a support, and a bar co-acting with the other part having a portion securable to the other side of said support and adapted to draw the latter part of said molding toward the edge of said support during the securement of said bar thereto.

2. In combination, a support, a molding including a pair of angularly disposed parts for embracing the top surface and adjacent edge of said support respectively, a member clamping one of said parts upon the top surface of said support, and an angle bar on the other part having a portion co-acting with said member and a portion securable to said support for drawing the latter part of said molding toward the edge of said support during attachment of said bar thereto.

3. In combination, a support, a molding including a pair of angularly disposed sides, a bolt extending through said support and clamping one of said sides upon one surface of said support, a nut on said bolt adjacent the opposite surface of said support, and means including a metal bar swingably mounted on the outer edge portion of the other side of said molding, said bar being engageable on said bolt between said nut and the adjacent side of said support while one side of said molding is spaced from the edge of said support and adapted to urge the latter side of said molding inwardly with respect to the edge of said support and outwardly with respect to the surfaces thereof during tightening of said nut on said bolt.

4. In combination, a support, a molding comprising springy material and including a pair of angularly disposed sides, one side being seated on a surface of said support and the other side being sprung outwardly from the adjacent edge of said support when released, an angular member connected with the outwardly sprung side of said molding having a corner portion engagable with said support, and means for fixing said member on said support and tilting the member thereon about said corner portion so as to urge the outwardly sprung side of said molding toward the edge of said support.

5. In combination, a support, a molding comprising springy material and including a pair of angularly disposed sides, one side being seated on a surface of said support and the other side being sprung outwardly from the adjacent edge of said support when released, and a metal strip mounted on said support having an edge pivotally interlocked with the latter side of the molding for urging the same inwardly with respect to the edge of said support, said means being adapted to hold the surface engaging side of the molding in engagement with the surface of the support.

6. In combination, a support, a molding comprising springy material and including a pair of angularly disposed sides, one side being seated on a surface of said support and the other side being sprung outwardly from the adjacent edge of said support when released, means clamping the surface engaging side of said molding on said support, and a member mounted on said support having an edge portion pivotally interlocked with the edge portion of the other side of said molding for holding the same inwardly with respect to its released position.

7. In combination with a running board, a molding including a pair of angularly disposed sides, one seated on the upper side of said running board and the other projecting downwardly in advance of the adjacent edge thereof, a bead on the lower edge of the latter side of said molding, and a member mounted on the lower side of said running board having an edge pivotally engaged in said bead and normally holding the downwardly extending side of said molding in close proximity to the edge of said support.

8. In combination with a running board, a molding including a pair of angularly disposed sides, one seated on the upper side of said running board and the other projecting downwardly in advance of the adjacent edge thereof, a member clamping the upper side of said molding on said running board, and means mounted on the lower side of said running board pivotally connected with the lower edge of the downwardly extending side of said molding for holding the same in close proximity to the edge of said running board.

9. In combination with a running board, a molding including a pair of angularly disposed flanges, one seated on the upper side of said running board and the other extending downwardly in advance of the adjacent edge thereof and protruding beyond the lower side of said molding, fastening means secured to the lower side of the upper flange and extending through said running board, and a member held on the lower side of said running board by said fastening means and pivotally attached to the downwardly extending flange of the molding for drawing the latter flange downwardly toward the edge of said running board during clamping of the upper flange thereon.

10. In combination with a running board, a molding including a pair of angularly disposed flanges, one seated on the upper side of said running board and the other extending downwardly in advance of the adjacent edge thereof and protruding beyond the lower side of said molding, fastening means secured to the lower side of the upper flange and extending through said running board, and a member held on the lower side of said running board by said fastening means and attached to the downwardly extending flange of the molding and having a portion engageable with and tiltable on said running board for drawing the latter flange downwardly toward the edge of said running board during clamping of the upper flange thereon, said fastening means being concealed at its upper end by the upper flange and at its lower end by the protruding portion of the downwardly extending flange.

11. In combination with a running board, a molding including a pair of angularly disposed flanges, one seated on the upper side of said running board and the other extending downwardly in advance of the adjacent edge thereof, a bolt having one end secured to the upper side engaging flange of the molding, an angular member on the lower end of said bolt having an outer edge connected with the downwardly extending flange and having its angular edge bearing upon the lower side of said running board, and a nut on the lower end of said bolt for rocking said member upon its angular edge so as to draw the downwardly extending flange of the molding inwardly and downwardly.

12. In combination with a running board having a recess adjacent its edge, a mat on said running board, a molding including an angle bar, one side of said molding being seated in said recess and having a longitudinal groove therein, a tread strip in said groove, a flange on the latter side of said molding overlapping an edge portion of said mat, and means for securing said molding in place including a member for urging the other side of the molding inwardly and downwardly with respect to said running board.

13. A molding for a running board including a pair of angularly disposed flanges, a dove-tail rib on one of said flanges having a channel open at the inner surface of said flange and adapted for receiving a bolt head and to conceal the latter, and a member on the other flange for rigidly securing the same to a running board.

14. A molding for a running board including a horizontal part having a trough in its upper side, a tread strip in said trough, and a trough formed in the lower side of said horizontal part for receiving the head of a fastening member and having converging sides for securing said fastening member against displacement.

15. A molding for a running board including a horizontal part having a trough in its upper side, a tread strip in said trough, a trough formed in the lower side of said horizontal part for receiving the head of a fastening member and having converging sides for securing said fastening member against separation from said molding, and a downwardly extending part.

17. A molding for a running board including an angle bar, a pair of troughs, one formed in each side of one of the flanges of said bar, a tread strip in the external trough, the open side of the other trough being constricted so as to secure a fastening member against separation from said molding, and a member on the other flange for securing the latter to a running board.

17. A molding for a running board including an angle bar, having a groove formed in the internal side of one flange, the open side of said groove being constricted so as to secure a fastening member against separation from said molding, and an extension on the other flange having a junction therewith of reduced thickness and adapted to be bent inwardly at said junction and secured to the lower side of a running board.

18. A molding for a running board including an angle bar having a groove formed in the internal side of one flange, the open side of said groove being constricted so as to secure a fastening member against displacement, and an extension on the other flange adapted to be bent inwardly and secured to a running board so as to firmly hold the latter flange adjacent the edge of said running board.

19. In combination, a molding including a pair of angularly disposed parts for embracing the top surface and side edge of a support, and having an angular shaped section on the extremity of said edge engaging part, and means for clamping one of said parts upon the top surface of said support and securing said angular shaped section to the lower side of said support, said angular shaped section being adapted to draw the edge engaging part of said molding toward the edge of said support as said angular shaped section is secured to the lower side thereof.

ALONZO R. KETCHAM.